United States Patent
Asterjadhi et al.

(10) Patent No.: US 9,929,847 B2
(45) Date of Patent: Mar. 27, 2018

(54) SHORTENED BLOCK ACKNOWLEDGEMENT WITH FRAGMENTATION ACKNOWLEDGEMENT SIGNALING

(71) Applicant: QUALCOMM Incorporated, San Diego, CA (US)

(72) Inventors: Alfred Asterjadhi, San Diego, CA (US); Simone Merlin, San Diego, CA (US); George Cherian, San Diego, CA (US); Santosh Paul Abraham, San Diego, CA (US); Gwendolyn Denise Barriac, Encinitas, CA (US); Rahul Malik, San Diego, CA (US); Gang Ding, San Diego, CA (US); Guido Robert Frederiks, Watsonville, CA (US); James Simon Cho, Mountain View, CA (US)

(73) Assignee: QUALCOMM Incorporated, San Diego, CA (US)

(*) Notice: Subject to any disclaimer, the term of this patent is extended or adjusted under 35 U.S.C. 154(b) by 114 days.

(21) Appl. No.: 14/978,039

(22) Filed: Dec. 22, 2015

(65) Prior Publication Data
US 2016/0182205 A1    Jun. 23, 2016

Related U.S. Application Data

(60) Provisional application No. 62/201,516, filed on Aug. 5, 2015, provisional application No. 62/190,239, filed
(Continued)

(51) Int. Cl.
*H04W 4/00*    (2009.01)
*H04L 5/00*    (2006.01)
(Continued)

(52) U.S. Cl.
CPC .......... *H04L 5/0055* (2013.01); *H04L 1/1614* (2013.01); *H04L 1/1685* (2013.01); *H04W 72/04* (2013.01)

(58) Field of Classification Search
None
See application file for complete search history.

(56) References Cited

U.S. PATENT DOCUMENTS

2006/0034274 A1    2/2006  Kakani et al.
2007/0253447 A1*  11/2007  Jiang ..................... H04L 1/0083
                                                                370/474
(Continued)

FOREIGN PATENT DOCUMENTS

EP        1626520 A1    2/2006
WO    2014014577 A1    1/2014

OTHER PUBLICATIONS

International Search Report and Written Opinion—PCT/US2015/000267—ISA/EPO—Mar. 29, 2016.

*Primary Examiner* — Bob Phunkulh
(74) *Attorney, Agent, or Firm* — Paterson & Sheridan, L.L.P.

(57) ABSTRACT

Certain aspects of the present disclosure provide methods and apparatus for using a shortened block acknowledgement (BlockAck) frame capable of acknowledging fragments. Such a shortened BlockAck frame may include a bitmap field having a shorter length than that of a basic BlockAck frame in the IEEE 802.11 standard (i.e., <128 octets). One example method for wireless communications generally includes receiving a plurality of protocol data units (PDUs) (e.g., media access control (MAC) protocol data units (MPDUs)); determining whether each of the PDUs was successfully received and whether each of the PDUs is associated with a non-fragmented service data unit (SDU) (e.g., MAC service data unit (MSDU)) or a fragmented SDU; and outputting for transmission a shortened BlockAck frame comprising a bitmap field indicating a receive status for the
(Continued)

non-fragmented and fragmented SDUs based on the determination.

29 Claims, 14 Drawing Sheets

Related U.S. Application Data on Jul. 8, 2015, provisional application No. 62/183,176, filed on Jun. 22, 2015, provisional application No. 62/096,168, filed on Dec. 23, 2014.

(51) Int. Cl.
*H04L 1/16* (2006.01)
*H04W 72/04* (2009.01)

(56) References Cited

U.S. PATENT DOCUMENTS

| | | | | |
|---|---|---|---|---|
| 2010/0115365 A1* | 5/2010 | Tao | H04L 1/1614 | 714/748 |
| 2010/0205500 A1* | 8/2010 | Lee | H04L 1/1685 | 714/748 |
| 2010/0265903 A1* | 10/2010 | Maheshwari | H04L 1/0007 | 370/329 |
| 2010/0325507 A1* | 12/2010 | Sung | H04L 1/1867 | 714/749 |
| 2012/0140704 A1* | 6/2012 | Zhao | H04L 1/1874 | 370/315 |
| 2012/0314697 A1* | 12/2012 | Noh | H04L 1/1628 | 370/338 |
| 2012/0314719 A1* | 12/2012 | Agiwal | H04W 28/02 | 370/474 |
| 2013/0114748 A1* | 5/2013 | Kubota | H04L 1/188 | 375/259 |
| 2013/0223345 A1* | 8/2013 | Asterjadhi | H04L 69/04 | 370/328 |
| 2014/0146834 A1* | 5/2014 | Agiwal | H04W 28/06 | 370/471 |
| 2015/0071051 A1* | 3/2015 | Zhu | H04W 72/121 | 370/216 |

\* cited by examiner

BlockAck frame variant encoding (11aa)

| Multi-TID subfield value | Compressed Bitmap subfield value | GCR subfield value (11aa) | BlockAck frame variant |
|---|---|---|---|
| 0 | 0 | 0 | Basic BlockAck |
| 0 | 1 | 0 | Compressed BlockAck |
| 1 | 0 | 0 | Extended Compressed BlockAck (11ad) |
| 1 | 1 | 0 | Multi-TID BlockAck |
| 0 | 0 | 1 | Reserved (11aa) |
| 0 | 1 | 1 | GCR BlockAck (11aa) |
| 1 | 0 | 1 | Reserved (11aa) |
| 1 | 1 | 1 | Reserved (11aa) |

US 9,929,847 B2

SHORTENED BLOCK ACKNOWLEDGEMENT WITH FRAGMENTATION ACKNOWLEDGEMENT SIGNALING

CLAIM OF PRIORITY UNDER 35 U.S.C. §119

The present Application for Patent claims benefit of U.S. Provisional Patent Application Ser. No. 62/096,168, filed Dec. 23, 2014, U.S. Provisional Patent Application Ser. No. 62/183,176, filed Jun. 22, 2015, U.S. Provisional Patent Application Ser. No. 62/190,239, filed Jul. 8, 2015, U.S. Provisional Patent Application Ser. No. 62/201,516, filed Aug. 5, 2015, each assigned to the assignee hereof and hereby expressly incorporated by reference herein.

BACKGROUND

Field of the Disclosure

Certain aspects of the present disclosure generally relate to wireless communications and, more particularly, to using a shortened block acknowledgement (BlockAck) frame capable of acknowledging fragments.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed. Once such scheme allows multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters). Another scheme to achieve greater throughput is HEW (High Efficiency WiFi or High Efficiency WLAN) being developed by the IEEE 802.11ax task force. The goal of this scheme is to achieve a throughput 4× that of IEEE 802.11ac.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved communications in a wireless network.

Certain aspects of the present disclosure generally relate to using a shortened block acknowledgement (BlockAck) frame capable of acknowledging fragments. The shortened BlockAck frame may include a bitmap field having a shorter length than that of a basic BlockAck frame (e.g., <128 octets).

Certain aspects of the present disclosure provide a method for wireless communications by an apparatus. The method generally includes receiving a plurality of protocol data units (PDUs), determining whether each of the PDUs was successfully received and whether each of the PDUs is associated with a non-fragmented service data unit (SDU) or a fragmented SDU, and outputting for transmission a shortened BlockAck frame comprising a bitmap field indicating a receive status for the non-fragmented and fragmented SDUs based on the determination.

Certain aspects of the present disclosure provide an apparatus for wireless communications. The apparatus generally includes a processing system configured to receive a plurality of PDUs, to determine whether each of the PDUs was successfully received and whether each of the PDUs is associated with a non-fragmented SDU or a fragmented SDU, and to output for transmission a shortened BlockAck frame comprising a bitmap field indicating a receive status for the non-fragmented and fragmented SDUs based on the determination.

Certain aspects of the present disclosure provide an apparatus for wireless communications. The apparatus generally includes means for receiving a plurality of PDUs, means for determining whether each of the PDUs was successfully received and whether each of the PDUs is associated with a non-fragmented SDU or a fragmented SDU, and means for outputting for transmission a shortened BlockAck frame comprising a bitmap field indicating a receive status for the non-fragmented and fragmented SDUs based on the determination.

Certain aspects of the present disclosure provide a non-transitory computer-readable medium for wireless communications. The medium has instructions stored thereon, which are executable (e.g., by an apparatus, such as a computer processor) to receive a plurality of PDUs, to determine whether each of the PDUs was successfully received and whether each of the PDUs is associated with a non-fragmented SDU or a fragmented SDU, and to output for transmission a shortened BlockAck frame comprising a bitmap field indicating a receive status for the non-fragmented and fragmented SDUs based on the determination.

Certain aspects of the present disclosure provide a wireless node. The wireless node generally includes at least one antenna, a receiver, a processing system, and a transmitter. The receiver is generally configured to receive a plurality of PDUs via the at least one antenna. The processing system is generally configured to determine whether each of the PDUs was successfully received and whether each of the PDUs is associated with a non-fragmented DU or a fragmented SDU. The transmitter is generally configured to transmit a shortened BlockAck frame comprising a bitmap field indicating a receive status for the non-fragmented and fragmented SDUs based on the determination.

Certain aspects of the present disclosure provide a method for wireless communications by an apparatus. The method generally includes outputting a plurality of PDUs for transmission, wherein each of the PDUs is associated with a non-fragmented SDU or a fragmented SDU, receiving a shortened BlockAck frame comprising a bitmap field indicating a receive status for the non-fragmented and fragmented SDUs, and processing the bitmap field in the shortened BlockAck frame to determine whether the non-fragmented and fragmented SDUs were successfully received.

Certain aspects of the present disclosure provide an apparatus for wireless communications. The apparatus generally includes a processing system configured to output a plurality of PDUs for transmission, wherein each of the PDUs is associated with a non-fragmented SDU or a fragmented SDU, to receive a shortened BlockAck frame comprising a bitmap field indicating a receive status for the non-fragmented and fragmented SDUs, and to process the bitmap field in the shortened BlockAck frame to determine whether the non-fragmented and fragmented SDUs were successfully received.

Certain aspects of the present disclosure provide an apparatus for wireless communications. The apparatus generally includes means for outputting a plurality of PDUs for transmission, wherein each of the PDUs is associated with a non-fragmented SDU or a fragmented SDU, means for receiving a shortened BlockAck frame comprising a bitmap field indicating a receive status for the non-fragmented and fragmented SDUs, and means for processing the bitmap field in the shortened BlockAck frame to determine whether the non-fragmented and fragmented SDUs were successfully received.

Certain aspects of the present disclosure provide a non-transitory computer-readable medium for wireless communications. The medium has instructions stored thereon, which are executable (e.g., by an apparatus, such as a processing system) to output a plurality of PDUs for transmission, wherein each of the PDUs is associated with a non-fragmented SDU or a fragmented SDU, to receive a shortened BlockAck frame comprising a bitmap field indicating a receive status for the non-fragmented and fragmented SDUs, and to process the bitmap field in the shortened BlockAck frame to determine whether the non-fragmented and fragmented SDUs were successfully received.

Certain aspects of the present disclosure provide a wireless node. The wireless node generally includes at least one antenna, a receiver, a processing system, and a transmitter. The transmitter is generally configured to transmit a plurality of PDUs via the at least one antenna, wherein each of the PDUs is associated with a non-fragmented SDU or a fragmented SDU. The receiver is generally configured to receive a shortened BlockAck frame comprising a bitmap field indicating a receive status for the non-fragmented and fragmented SDUs. The processing system is generally configured to process the bitmap field in the shortened BlockAck frame to determine whether the non-fragmented and fragmented SDUs were successfully received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
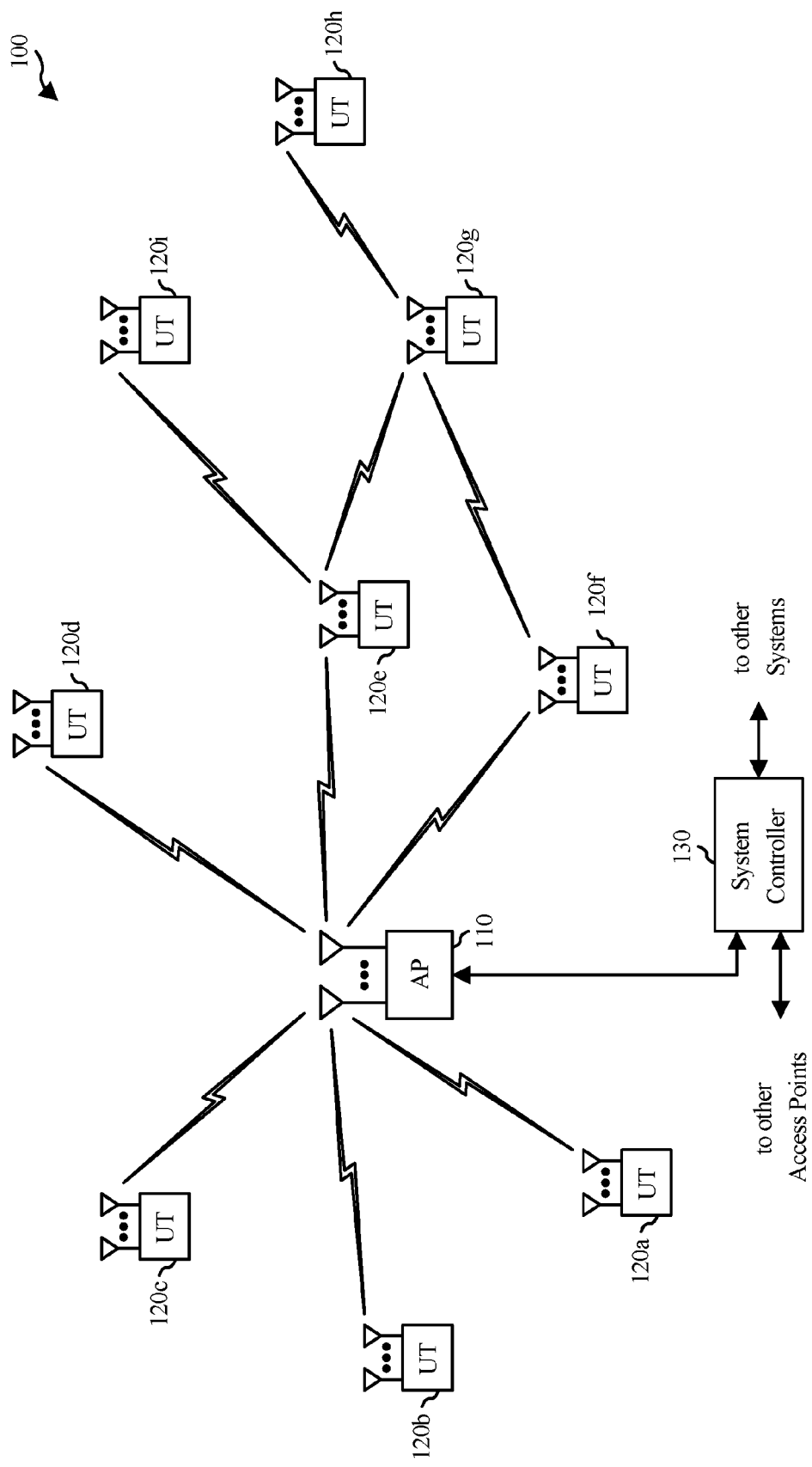
FIG. 1 illustrates an example wireless communications network, in accordance with certain aspects of the present disclosure.

Aspects of the present disclosure provide techniques for allowing data units to be sent as multiple fragments that may be collectively or separately acknowledged. As will be described in greater detail below, such fragmentation may result in efficient use of uplink and downlink resources. In some cases, fragmentation parameters may be negotiated to achieve certain objectives, such as reducing the amount of memory and processing resources used by both originating and receiving devices to process fragmented transmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a wireless communications system 100 in which aspects of the disclosure may be performed. For example, a user terminal 120 (or a processing system therein) may receive a plurality of protocol data units (PDUs), determine whether each of the PDUs was successfully received (e.g., from the access point 110) and whether each of the PDUs is associated with a non-fragmented service data unit (SDU) or a fragmented SDU; and output for transmission a shortened block acknowledgment (Block-Ack) frame comprising a bitmap field indicating a receive status for the non-fragmented and fragmented SDUs based on the determination.

The system 100 may be, for example, a multiple-access multiple-input multiple-output (MIMO) system with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
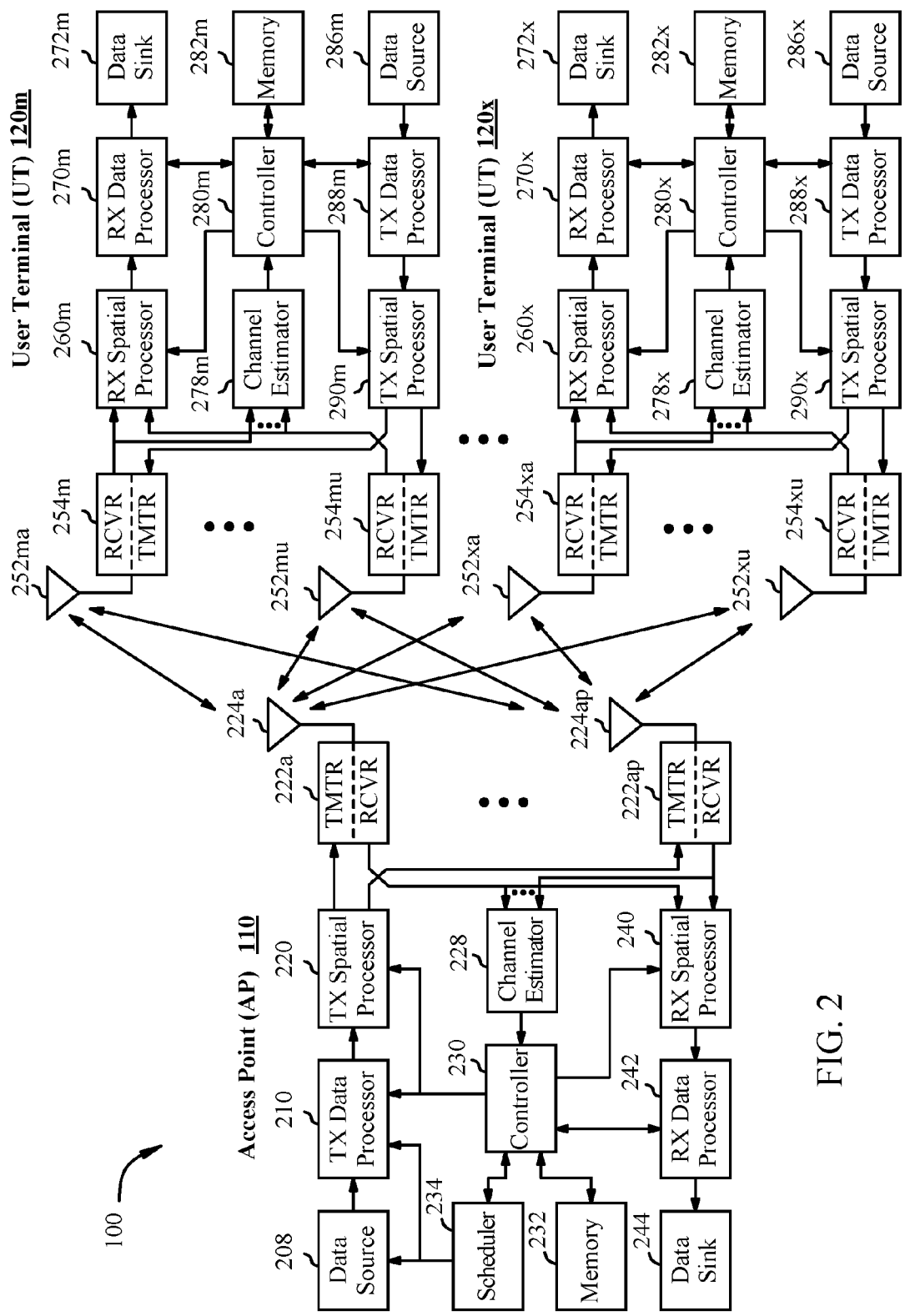
FIG. 2 is a block diagram of an example access point (AP) and user terminals, in accordance with certain aspects of the present disclosure.

FIG. 2 illustrates a block diagram of a system 100 in which aspects of the present disclosure may be performed. For example, the access point 110 (or a processing system therein) may output a plurality of PDUs for transmission, wherein each of the PDUs is associated with a non-fragmented SDU or a fragmented SDU; receive a shortened BlockAck frame comprising a bitmap field (e.g., a Block Ack bitmap field) indicating a receive status for the non-fragmented and fragmented SDUs; and process the bitmap field in the shortened BlockAck frame to determine whether the non-fragmented and fragmented SDUs were successfully received.

The system 100 may be, for example, a MIMO system with access point 110 and two user terminals 120m and 120x. The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device (e.g., an AP or STA) capable of transmitting data via a wireless channel, and a "receiving entity" is an independently operated apparatus or device (e.g., an AP or STA) capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
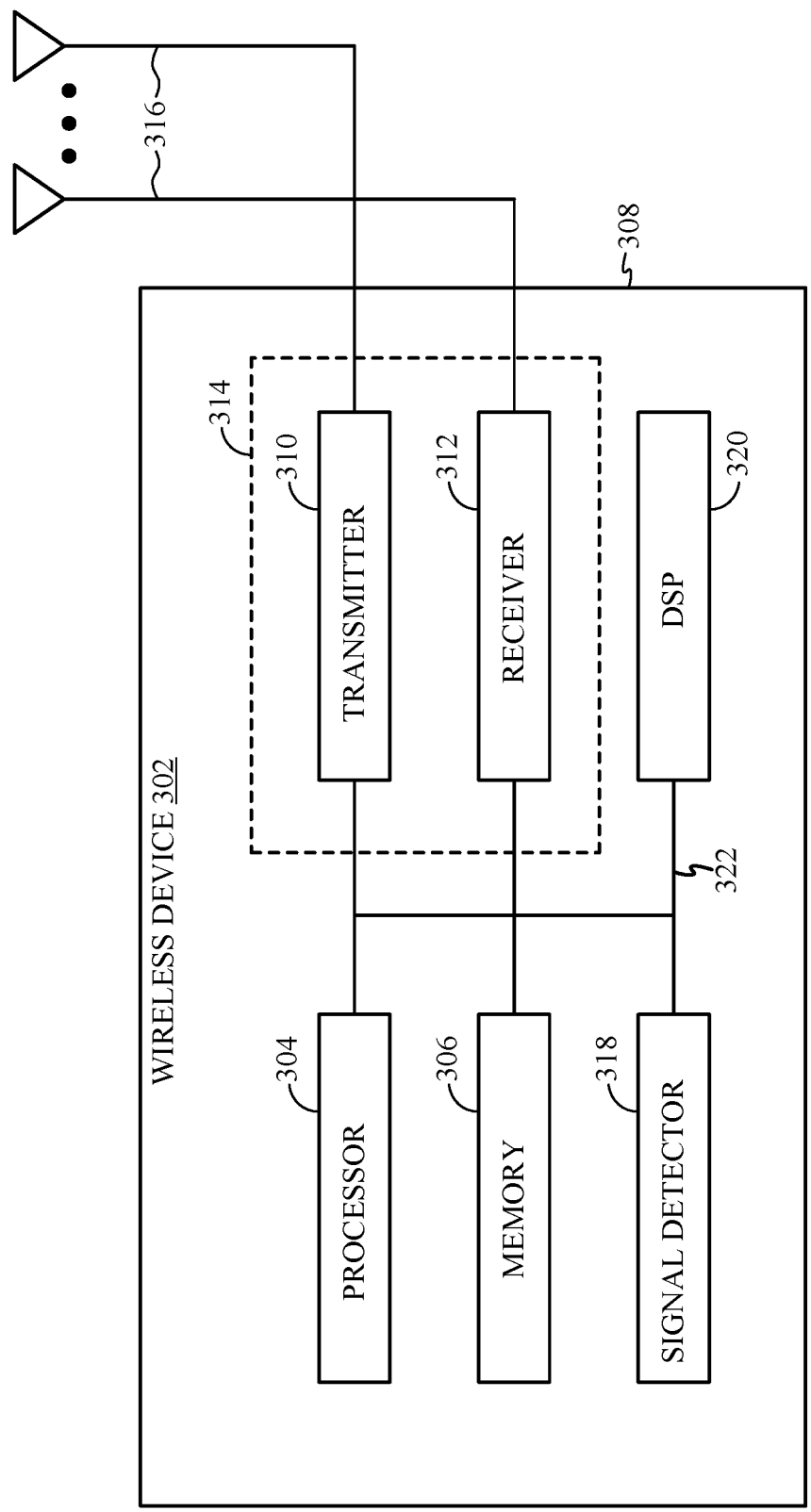
FIG. 3 is a block diagram of an example wireless device, in accordance with certain aspects of the present disclosure.

FIG. 3 illustrates various components that may be utilized in a wireless device 302 that may be employed within the system 100. The wireless device 302 is an example of a device that may be configured to implement the various methods described herein. For example, the wireless device may implement operations 700 or 800 illustrated in FIGS. 7 and 8, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Shortened Block Acknowledgement

As noted above, aspects of the present disclosure provide techniques for sending data units using fragmentation, which may result in efficient use of uplink and downlink resources. As used herein, the term fragmentation generally refers to the process of partitioning a data unit, such as a MAC service data unit (MSDU) or MAC management protocol data unit (MMPDU), into smaller data units (e.g., MPDUs) for transmission.

In some cases, the fragment length may be the same for all fragments except for the last, which may be smaller than the others to just accommodate a remaining portion. Additionally, the length of each fragment (except for the last fragment), may be an even number of octets. The length of each fragment may be limited to never exceed a certain fragmentation threshold (e.g., with the threshold specified by a parameter dot11FragmentationThreshold in IEEE 802.11). In some cases, for example, if security encapsulation is invoked, the fragment length may exceed this threshold due to encapsulation overhead. Once a fragment is transmitted for the first time, the frame body content and length may be fixed until the fragment is successfully delivered to a recipient station (STA).

Defragmentation generally refers to the process of reassembling an MSDU/MMPDU from its constituent fragments. Reassembly is generally performed by combining fragments in order of fragment number (FN) subfield. A mechanism may be utilized to identify a last fragment. For example, a fragment with the More Fragments bit equal to 0 indicates the last fragment for this particular MSDU/MMPDU, based on its sequence number (SN).

In certain wireless communications systems, such as IEEE 802.11ax (also known as high efficiency wireless (HEW) or high efficiency wireless local area network (WLAN)), data rates of 750 kbps and lower are being proposed (e.g., MCS0 in 2.5 MHz), which suggests the use of fragmentation. In multi-user (MU) operation, where an AP communicates with multiple STAs, the AP may allocate resources by sending a trigger frame that provides the resource allocations per-STA for the rest of the granted transmission opportunity (TXOP).

In an effort to fully use the allocated resource, the STA may fragment the MSDU on-the-fly. The fragment length and the number of fragments may be determined once the STA knows the allocated resource for its current transmission. The fragmentation threshold (that controls the length of fragments) may be changed dynamically every MSDU to fully use the granted TXOP. In certain embodiments, the fragmentation threshold may control the length of each fragment of the same MSDU. The first fragment may be transmitted during the allocated resource in the granted TXOP. The remaining n–1 fragments may be queued for transmission in subsequent TXOPs. This baseline method generates multiple fragments, each of which are carried in an MPDU. The lower the payload of the fragment, the larger the number of fragments (i.e., the higher the impact of the PHY/MAC/security overhead).

To remove some of the PHY overhead, it may be useful to allow aggregated MPDU (A-MPDU) aggregation of fragments (with other fragments or full MPDUs), although this adds some overhead from A-MPDU delimiters and padding. As an example, such aggregation of fragments may be performed in an effort to efficiently fill a low data rate allocation (e.g., efficiently filling an allocation may entail 2000 bytes of data: a 1500B non-fragmented MSDU plus a 500B fragment of another, fragmented MSDU). As another example, A-MPDU aggregation of fragments may be done to efficiently transmit the remaining fragment of an MSDU in a subsequent transmit opportunity (TXOP). Retransmission in a subsequent TXOP may entail fragment aggregation. Once a packet has been fragmented and transmitted, it should be retransmitted in the same manner; otherwise, reassembly (defragmentation) is complicated. For certain aspects, an A-MPDU may contain non-fragmented MSDUs and at most one fragment of an MSDU (i.e., an A-MSDU cannot contain more than one fragment of the same MSDU).

Figure 4:
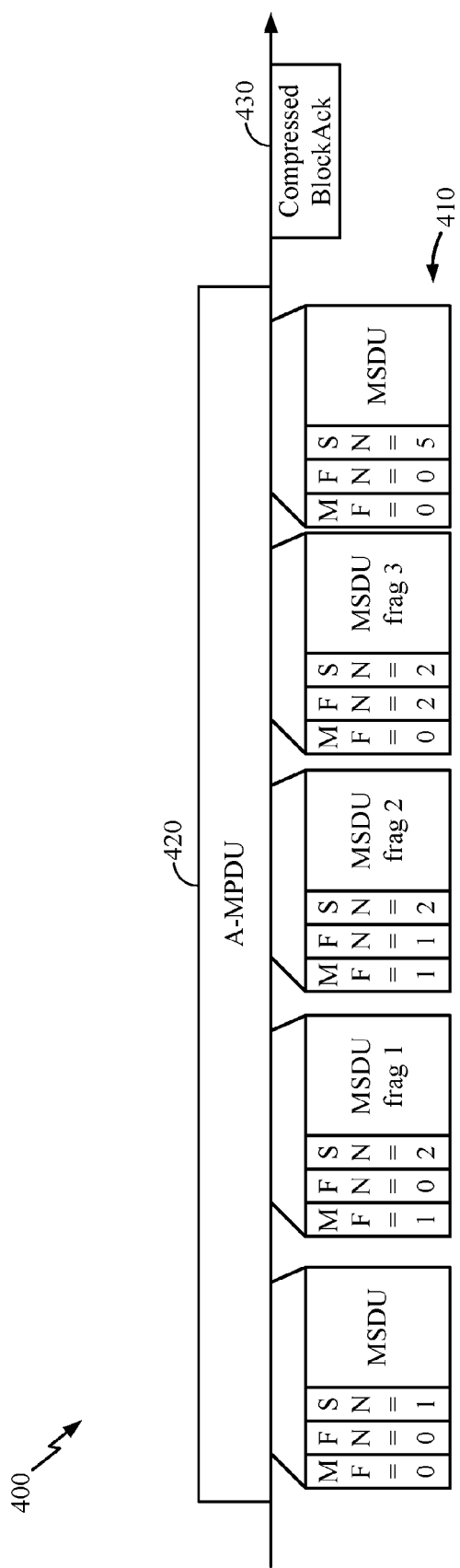
FIG. 4 illustrates using a shortened block acknowledgment (Block Ack or BA) frame capable of acknowledging one or more fragments in an aggregated media access control (MAC) protocol data unit (A-MPDU), in accordance with certain aspects of the present disclosure.

FIG. 4 illustrates an example aggregation of fragment MPDUs in an A-MPDU 420, in accordance with certain aspects of the present disclosure. In the illustrated example, MSDUs 410 with sequence numbers 1 and 5 (SN=1 and SN=5) are unfragmented, while MSDU 410 with sequence number 2 (SN=2) is fragmented, with three fragments shown, with fragment numbers 1, 2, and 3 (FN=1, FN=2, and FN=3). As illustrated, a more fragment flag (MF) may be set to 1 in the first two fragments to indicate there are more fragments to come, while MF is set to 0 in the third fragment, indicating the last fragment.

Such fragment aggregation may be allowed without changing the basics of the immediate BlockAck procedure (e.g., each MSDU 410 may occupy one location of the BlockAck buffer and fragment MPDUs occupy independent buffers) and the fragmentation/defragmentation procedure. However, the basic BlockAck frame, capable of acknowledging up to 64 MSDUs having up to 16 fragments each, has a bitmap field with a length of 128 octets. A compressed BlockAck may be used that acknowledges up to 64 MSDUs and has a bitmap field with a length of only 8 octets. While shorter than a normal BlockAck frame (e.g., defined by a standard), this type of compressed BlockAck frame does not acknowledge fragmented MSDUs or fragments thereof.

To address this, aspects of the present disclosure provide a BlockAck frame capable of acknowledging fragmented and non-fragmented MSDUs, but having a reduced size compared to a basic BlockAck frame. In some cases, shortened or "compressed" BlockAck frame may reduce overhead and be capable of acknowledging fragmented MSDUs without significant changes in signaling of the basic BlockAck frame.

In some cases, a recipient may select a type of Block Ack Frame on a per A-MPDU basis. After receiving an A-MPDU, according to this option, the recipient may generate a BlockAck frame that is either a modified version of the compressed BlockAck frame (one type of shortened BlockAck frame) or a basic BlockAck Frame. The shortened BlockAck frame (labeled "Compressed BlockAck*" in FIG. 4) may have the same length as a compressed BlockAck (32 octets with an 8-octet bitmap). However, each bit in the shortened frame's bitmap may indicate the receive status of a non-fragment (A-)MSDU and one of the following: (1) the first fragment of the fragmented MSDU; (2) all the fragments of the MSDU; or (3) the sole fragment of the MSDU that is contained in the A-MPDU that elicited the BlockAck frame. If a basic BlockAck frame is selected instead, this frame has a length of 152 octets and a bitmap having a length of 128 octets. Each bit in the basic frame's bitmap indicates the receive status of each MPDU (fragment or non-fragment) within the receive block acknowledgment window.

In some cases, the originator may receive a shortened BlockAck frame with partial information, which may occur when: (1) there is no receive status indication for fragments other than the first fragment of a given sequence number (SN); (2) there is an unsuccessful receive status indication for at least one of the fragments of a given SN (i.e., bit set to 0 for the SN); or (3) there is no receive status for the sole fragment contained in the A-MPDU that elicited the BlockAck frame. If the originator receives a shortened BlockAck frame with partial information, then the originator may either solicit a basic BlockAck frame by sending a block acknowledgement request (BAR) frame or retransmit all the fragments of the MSDU that had an unsuccessful receive status.

One disadvantage with a recipient selecting the type of Block Ack frame is that a basic BlockAck frame may be generated as a response in certain situations. The frequency of this happening may depend on the number of fragments included in an A-MPDU. Rather than use either a modified version of the compressed BlockAck frame (32 octets) or the basic BlockAck frame (152 octets), other options are described below for a shortened BlockAck frame having a reduced length compared to the basic BlockAck frame, but whose information content is not as limited as the modified version of the compressed BlockAck frame.

Figure 5:
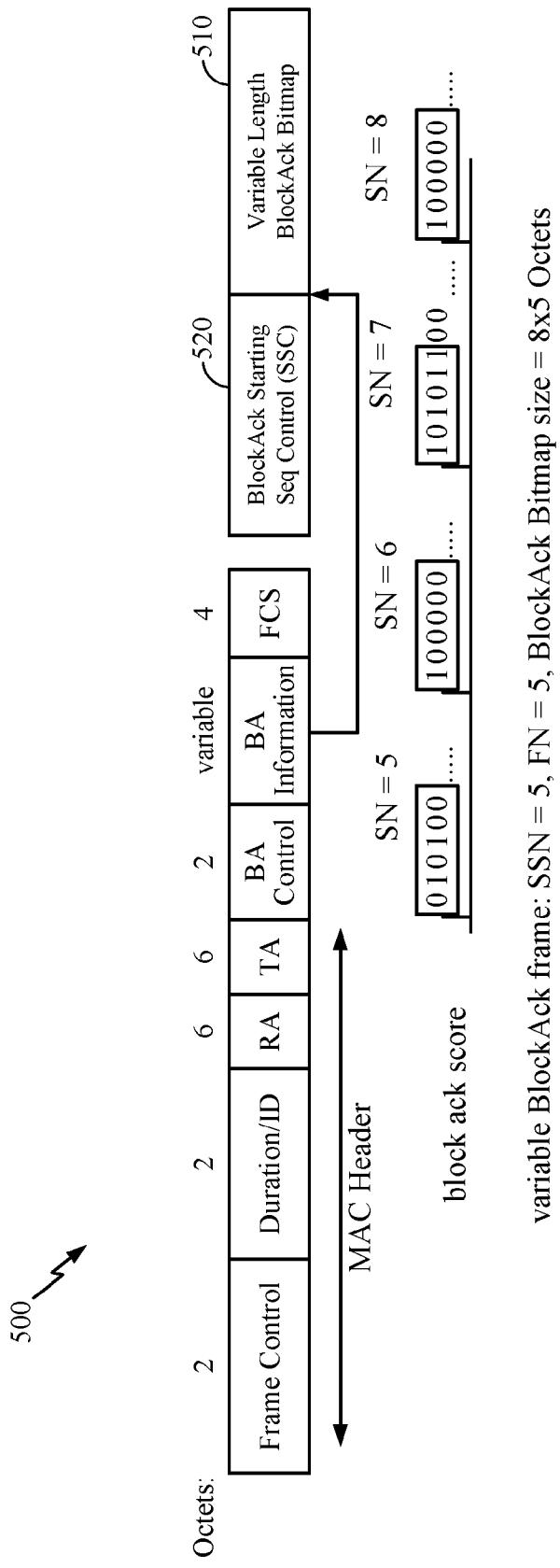
FIG. 5 illustrates a shortened BlockAck frame having a variable-length bitmap field, in accordance with certain aspects of the present disclosure.

As illustrated in FIG. 5, in some cases, a shortened BlockAck frame 500 having a variable-length bitmap field 510 may be used. This bitmap size may be dependent on a number of fragments and may be variable, for example, between 8 and 128 octets, for example. The shortened BlockAck frame may be used, for example, to acknowledge 64 (A-)MSDUs and fragments up to the Fragment Number (FN) subfield in the Block Ack Starting Sequence Control (SSC) field 520 in the shortened BlockAck frame. FIG. 5 illustrates how an originator and recipient may track or "keep score" of which MSDUs/fragments have been successfully acknowledged. As will be described in greater detail below, in some cases, parameter may be negotiated to limit the memory overhead required for such tracking. For example, an originator and recipient may negotiate a maximum number of fragmented transmissions that may be handled concurrently and/or a timer value used to flush fragments (if not all fragments of a fragmented transmission are successfully received, even successfully received fragments may be discarded).

The value of a Fragment Number subfield in the Block Ack SSC field may indicate the number of fragments per sequence number (SN) contained in the BlockAck bitmap field. When FN=0, non-fragmented MSDUs and the first fragment of fragmented MSDUs may be acknowledged by the shortened BlockAck frame. For other aspects, when FN=0, at most one fragment of each fragmented MSDU that is contained in the A-MPDU that elicited the shortened BlockAck frame (or contained in the A-MPDU that was transmitted between two A-MPDUs that elicited shortened BlockAck frames) and non-fragmented MSDUs may be acknowledged by the shortened BlockAck frame. If up to 64 MSDUs may be acknowledged, this leads to a BlockAck bitmap field having a length of 8 octets, which is the same length as the BlockAck bitmap field in a compressed BlockAck frame. When FN=N, non-fragment MSDUs and up to N+1 fragments of fragmented MSDUs may be acknowledged, leading to a bitmap field length of 8*(N+1) octets. In the worst case (e.g., where 64 MSDUs have 16 fragments), the "shortened" BlockAck frame having a variable-length bitmap field may be the same length as a basic BlockAck frame (152 Octets, with a bitmap field length of 128 octets).

Figure 6:
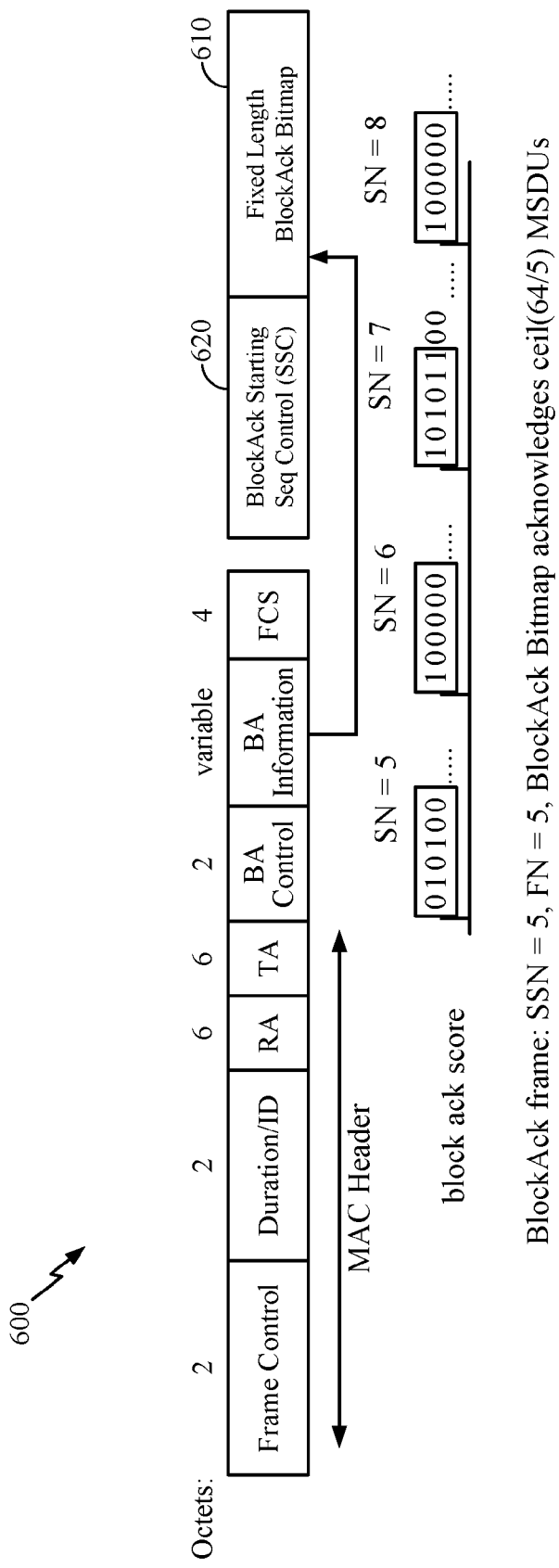
FIG. 6 illustrates a shortened BlockAck frame having a constant-length bitmap field, in accordance with certain aspects of the present disclosure.

As illustrated in FIG. 6, in some cases, a shortened BlockAck frame 600 having a fixed (e.g., constant-length) bitmap field may be used for fragment-dependent signaling. In some cases, the length of the bitmap field for the shortened BlockAck frame may be 8 octets, and the length of the shortened BlockAck frame may be the same as that of a compressed BlockAck frame (32 octets).

Similar to the case described above with reference to FIG. 5, a value of the Fragment Number subfield in the Block Ack SSC field may indicate the number of fragments per SN contained in the BlockAck bitmap field. When FN=0, non-fragmented MSDUs and the first fragment of fragmented MSDUs may be acknowledged by the shortened BlockAck frame. For other aspects, when FN=0, at most one fragment of each fragmented MSDU that is contained in the A-MPDU that elicited the shortened BlockAck frame (or contained in the A-MPDU that was transmitted between two A-MPDUs that elicited shortened BlockAck frames) and non-fragmented MSDUs may be acknowledged by the shortened BlockAck frame. With a bitmap field having a length of 8 octets, for example, up to 64 (A-)MSDUs may be acknowledged. When FN=N, non-fragment MSDUs and up to N+1 fragments of fragmented MSDUs may be acknowledged.

With a constant-length bitmap field, however, the shortened BlockAck frame may acknowledge up to ceil(M/(N+1)) (A-)MSDUs, where M is the fixed bitmap length in bits (e.g., M=64 bits=8 octets). In other words, the number of MSDUs that may be acknowledged by each shortened BlockAck frame with a constant-length bitmap field varies according to the FN. In some cases, only a portion of the fragments of the last MSDU may be acknowledged.

In some cases, for this option (i.e., at least one MSDU in the A-MPDU is fragmented in 16 fragments) only up to 4 MSDUs can be acknowledged (if M=64). If the number of fragments is lower, then more MSDUs can be acknowledged.

Note that while the description above refers to the use of a Fragment Number subfield (FN) in the Block Ack SSC field, a person having ordinary skill in the art will realize that any such field or subfield that is contained in the BlockAck frame itself may be used to provide the above-described signaling (e.g., the traffic identifier information (TID_INFO) subfield in the BA control field). For example, the shortened BlockAck frame may be defined as a multi-fragment BlockAck frame.

As will be described in greater detail below, a particular variant of a BlockAck frame may be distinguished from the other frame formats, for example, by using a reserved combination of the Multi-TID, Compressed Bitmap, and Group Cast Retries (GCR) subfields of the BA Control field.

For certain aspects, the TID_INFO field for a Multi-Fragment BlockAck frame may indicate the number of MSDUs that can be acknowledged with the frame (e.g., in units of 8 or 16, etc.), making it possible to dynamically vary the BlockAck bitmap field as a function of the MSDUs that can be acknowledged. For example, if the TID_INFO is 0 and the FN is 0, then the bitmap field may be 1 octet in length and carries acknowledgement information for 8 MSDUs and the first fragment of the MDSUs.

Figure 7:
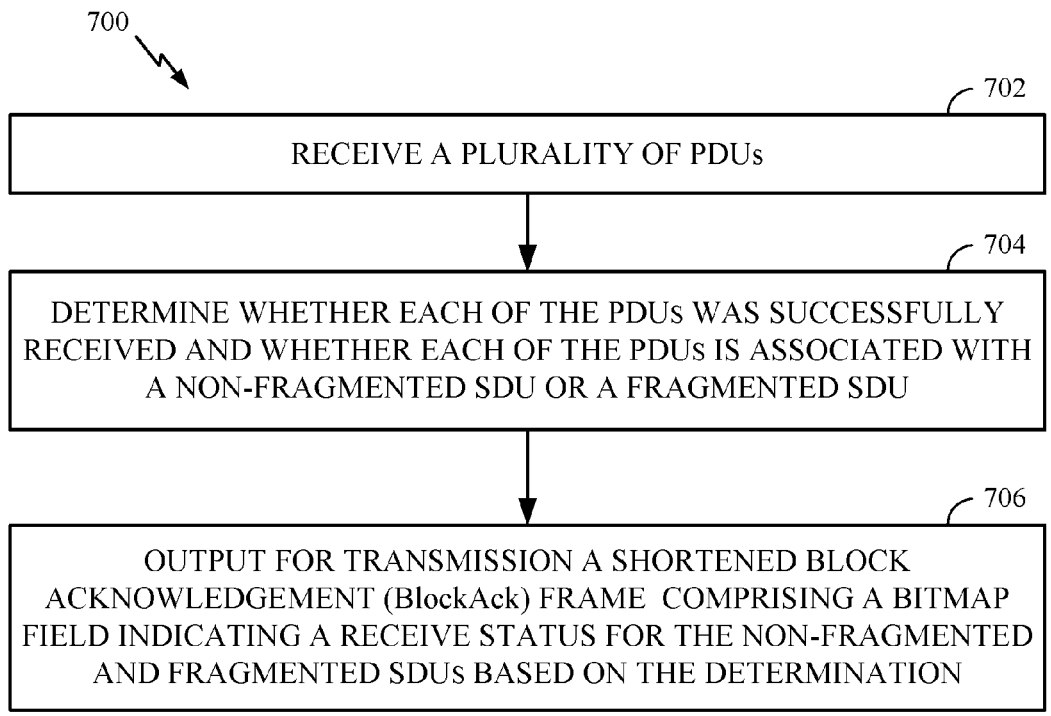
FIG. 7 is a flow diagram of example operations for outputting a shortened BlockAck frame for transmission, in accordance with certain aspects of the present disclosure.

FIG. 7 is a flow diagram of example operations 700 for outputting a shortened BlockAck frame for transmission, in accordance with certain aspects of the present disclosure. The operations 700 may be performed, for example, by an apparatus (e.g., AP 110, user terminal 120, or wireless device 302, or a processing system therein).

The operations 700 begin, at block 702, with the apparatus receiving a plurality of protocol data units (PDUs) (e.g., from another apparatus, which may be a user terminal 120 or AP 110). The plurality of PDUs may comprise a plurality of media access control (MAC) protocol data units (MPDUs). The plurality of MPDUs may comprise an aggregated MPDU (A-MPDU), for example.

At block 704, the apparatus determines whether each of the PDUs was successfully received. The apparatus also determines whether each of the PDUs is associated with a non-fragmented service data unit (SDU) or a fragmented SDU at block 704. For certain aspects, at least one of the PDUs comprises a fragment of one of the fragmented SDUs.

At block 706, the apparatus outputs a shortened block acknowledgment (BlockAck) frame for transmission. The shortened BlockAck frame includes a bitmap field indicating a receive status for the non-fragmented and fragmented SDUs based on the determination at block 704. In other words, the bits in the bitmap field are populated according to the determination at block 704 (e.g., a logic "1" may indicate that an SDU or a fragment thereof was successfully received, whereas a logic "0" may indicate the SDU or fragment thereof was not successfully received). For certain aspects, the non-fragmented and fragmented SDUs include non-fragmented and fragmented MAC service data units (MSDUs).

According to certain aspects, the operations 700 may further involve the apparatus receiving a block acknowledgement request after outputting the shortened BlockAck frame for transmission at block 706. In this case, the apparatus may output for transmission a basic BlockAck frame in response to the block acknowledgement request. A bitmap field in the basic BlockAck frame may indicate the receive status for the non-fragmented SDUs and each fragment of the fragmented SDUs based on the determination at block 704.

According to certain aspects, the operations 700 may further involve the apparatus selecting the shortened BlockAck frame over a basic BlockAck frame before the outputting at block 706.

According to certain aspects, the operations 700s further involve the apparatus outputting for transmission another shortened BlockAck frame before the receiving at block 702. In this case, the plurality of PDUs may comprise an A-MPDU, the non-fragmented and fragmented SDUs include non-fragmented and fragmented MSDUs, and the A-MPDU may include at most one fragment for each of the fragmented MSDUs.

Figure 8:
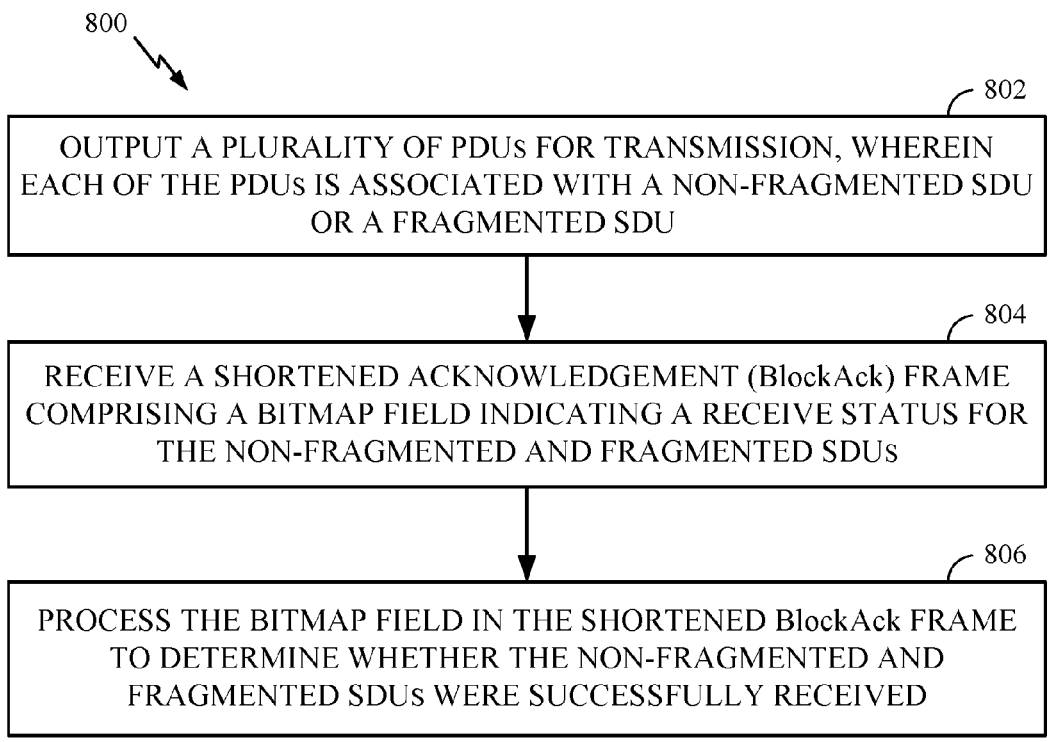
FIG. 8 is a flow diagram of example operations for using a shortened BlockAck frame for acknowledging fragmented and non-fragmented service data units (SDUs), in accordance with certain aspects of the present disclosure.

FIG. 8 is a flow diagram of example operations 800 for using a shortened BlockAck frame for acknowledging fragmented and non-fragmented service data units (SDUs) (e.g., MSDUs), in accordance with certain aspects of the present disclosure. The operations 800 may be performed, for example, by an apparatus (e.g., AP 110, wireless device 302, or user terminal 120, or a processing system therein).

The operations 800 begin, at block 802, with the apparatus outputting a plurality of protocol data units (PDUs) for transmission. Each of the PDUs is associated with a non-fragmented SDU or a fragmented SDU. For certain aspects, at least one of the PDUs is a fragment of one of the fragmented SDUs. The plurality of PDUs may comprise a plurality of media access control (MAC) protocol data units (MPDUs). The plurality of MPDUs may comprise an aggregated MPDU (A-MPDU), for example.

At block 804, the apparatus receives a shortened block acknowledgment (BlockAck) frame comprising a bitmap field indicating a receive status for the non-fragmented and fragmented SDUs. The apparatus processes the bitmap field in the shortened BlockAck frame, at block 806, to determine whether the non-fragmented and fragmented SDUs were successfully received.

This particular variant of a BlockAck frame may be distinguished from the other frame formats, for example, by using a reserved combination of the Multi-TID, Compressed Bitmap, and Group Cast Retries (GCR) subfields of the BA Control field. As an example, the settings in the $6^{th}$ row of table 900 in FIG. 9 may be used to indicate that the frame is a multi-fragment BlockAck frame. For example a Multi-Fragment BlockAck frame may be identified by setting the Multi-TID, Compressed Bitmap, and GCR values to all 1s, and the FN described above may, for example, either be indicated in the TID_INFO field of the BA Control field or in the FN subfield of the BlockAck SSC field According to certain aspects, the operations 800 may further involve the apparatus outputting a block acknowledgement request for transmission. This request may be output after the processing at block 806, for example, where the processing indicated that at least one of the non-fragmented and fragmented SDUs was not successfully received. The apparatus may also receive a basic BlockAck frame in response to the block acknowledgement request. The bitmap field in the basic BlockAck frame may indicate the receive status for each of the non-fragmented SDUs and each fragment of the fragmented SDUs.

According to certain aspects, after the processing at block 806 (which indicated that at least one of the fragmented SDUs was not successfully received, for example), the operations 800 may further involve the apparatus outputting for retransmission fragments of the at least one of the fragmented SDUs.

As noted above, the bitmap field in the shortened BlockAck frame has a shorter length than a bitmap field in a basic BlockAck frame. In other words, the bitmap field in the shortened BlockAck frame may have a length less than 128 octets.

As described with reference to FIG. 6, the bitmap field in the shortened BlockAck frame has a fixed length (e.g., 8 octets). In this case, a number of the non-fragmented and fragmented SDUs that can be acknowledged by the bitmap field in the shortened BlockAck frame may be variable. For example, the number of the non-fragmented and fragmented SDUs may be up to ceil(M/(N+1)), where M is the fixed length in bits and where the bitmap field in the shortened BlockAck frame can indicate the receive status for up to N+1 fragments for the fragmented SDUs. The shortened BlockAck frame may include a starting sequence control (SSC) field, and N may be a fragment number (FN) indicated by the SSC field.

In certain embodiments, both N and M can be signaled in the BlockAck frame itself. In such embodiments, any reserved field that precedes the BlockAck Bitmap field can be used for this purpose. In one example, the Fragment Number subfield can be used to signal these values, wherein 0 or more bits of the Fragment Number indicate the length of the BlockAck Bitmap field (which could take values that are multiples of an octet (e.g., 2 Octets, 4 octets, 8 Octets 32 octets representing the value of M in bytes). In some cases, 0 or more of the remaining bits of the Fragment Number could represent the value of N or a function of N (e.g., those remaining bits could indicate values of 0, 2, 4, 8 fragments). Any of the bits of the Fragment Number can be used for this purpose. As an example, the 2 MSBs of the Fragment Number field can indicate the value of the BlockAck Bitmap and the 2 LSBs of the Fragment Number can indicate the value of the Fragment Number. In this example, a value of the 2 MSBs equal to 0 could indicate a BlockAck Bitmap field size of 8 bytes (to be backward compatible with previous versions of the standard), a value equal to 1 could indicate 2 Octets, a value of 2 could indicate 32 Octets, and a value of 3 could indicate for example 128 Octets. Similarly, a value of the 2 LSBs equal to 0 could indicate no fragments (to be backward compatible as previously mentioned), for example, while a value of 1 could indicate 2 fragments, a value of 2 could indicate 4 fragments, and a value of 3 could indicate 16 fragments. In general, any combination of the values of the Fragment Number subfield can be used to indicate the size of the BlockAck Bitmap length and/or the number of fragments that are being acknowledged, as well.

As described with reference to FIG. 5, the bitmap field in the shortened BlockAck frame has a variable length. In this case, the variable length may be indicated by an FN in the shortened BlockAck frame. The shortened BlockAck frame may include an SSC field, and the FN may be indicated by the SSC field. For certain aspects, the FN=0, and each bit in the bitmap field in the shortened BlockAck frame may indicate the receive status for one of the non-fragmented SDUs or the first fragment of one of the fragmented SDUs. The bitmap field in the shortened BlockAck frame may have a length of 8 octets, for example. For certain aspects, the FN is a positive integer, and each bit in the bitmap field in the shortened BlockAck frame may indicate the receive status for one of the non-fragmented SDUs or each fragment of one of the fragmented SDUs. In this case, the FN=N, and the bitmap field in the shortened BlockAck frame may have a length of up to 8*(N+1) octets, for example.

According to certain aspects, each bit in the bitmap field in the shortened BlockAck frame may indicate the receive status for one of the non-fragmented SDUs or the first fragment of one of the fragmented SDUs. For other aspects, each bit in the bitmap field in the shortened BlockAck frame may indicate the receive status for one of the non-fragmented SDUs or collectively all fragments of one of the fragmented SDUs.

As noted above, in some cases, a particular variant of a BlockAck frame may be distinguished from other frame formats by using a reserved combination of various fields, such as the Multi-TID, Compressed Bitmap, and Group Cast Retries (GCR) subfields of the BA Control field.

Figure 9:
FIG. 9 is a table of example BlockAck frame variant encoding, in accordance with certain aspects of the present disclosure.

Referring to FIG. 9, as an example, the settings in the $6^{th}$ row of table 900 may be used to indicate that the frame is a multi-fragment BlockAck frame. As illustrated, a Multi-Fragment BlockAck frame may be identified by setting the Multi-TID, Compressed Bitmap, and GCR values to all 1s, and the FN described above may, for example, either be indicated in the TID_INFO field of the BA Control field or in the FN subfield of the BlockAck SSC field.

Figure 10:
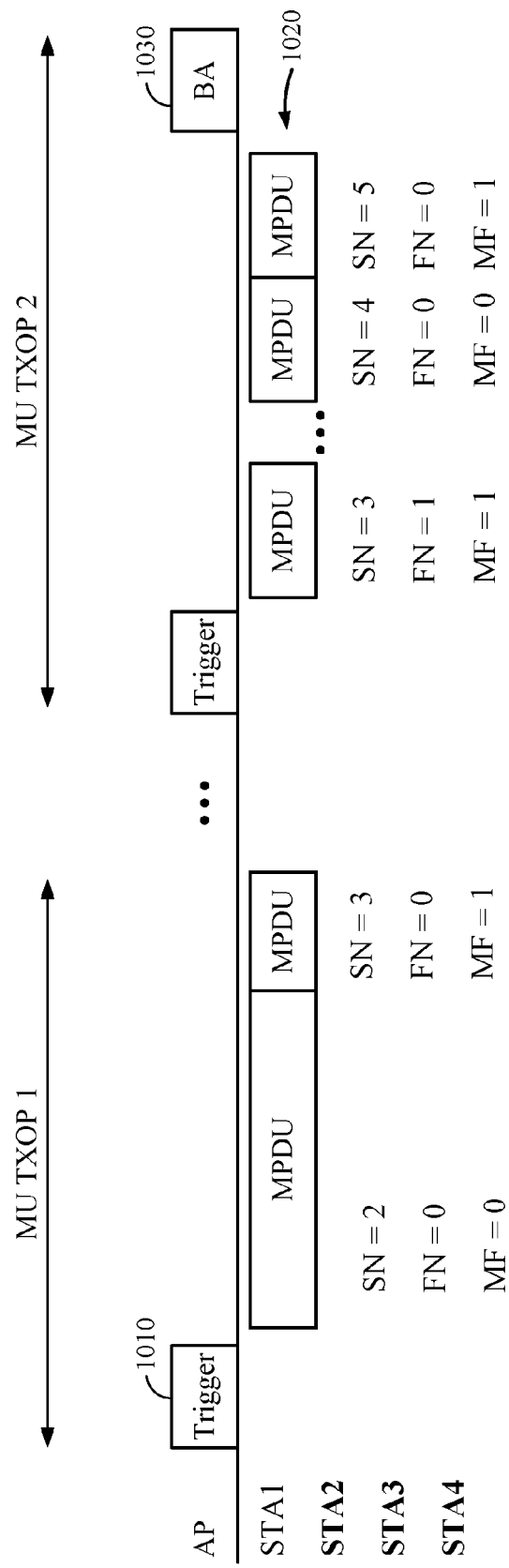
FIG. 10 illustrates an example exchange using fragmentation, in accordance with aspects of the present disclosure.

As illustrated in the example exchange 1000 of FIG. 10, the techniques for fragmentation presented herein may provide an efficient way of using allocated resources in MU transmissions 1020 initiated by a trigger frame 1010 sent by an AP. Such fragmentation may provide a means of providing feedback via a compressed Block Ack frame 1030 (in effect, closing the UL link) for limited range devices. In some cases, a block acknowledgement (Block Ack) protocol may also be provided that allows fragments to be carried in A-MPDUs when sent in MU mode. Such a protocol may help simplify the generation of fragments at an originating device, while reducing memory requirements at both the recipient and originating devices (e.g., by limiting the amount of memory required to keep track of which data units/fragments have been received). In some cases, compressed BlockAck frames 1010 may be used to acknowledge received fragments sent in an A-MPDU (which may be considered a form of an enhanced HT-Immediate Block Ack protocol).

As noted above, in some cases, STAs may negotiate fragmentation during BA setup. In other words, fragmentation-related parameters may be exchanged during a fragment-enabled BA session. In some cases, this negotiation may be performed during association (when a station associates with an AP). Regarding fragment generation at the originator, fragments may be carried in A-MPDUs under various restrictions specified by the recipient. These restrictions may include, for example, a maximum number (Max #) of concurrent fragmented MSDU/MMPDUs and a maximum number of fragments per MSDU/MMPDU. In some cases, only one fragment per MSDU shall be carried in an A-MPDU. In some cases, there may be no restriction (or dependency) to the length of the fragments.

Fragment acknowledgement at the recipient may be as follows. The recipient may keep full-state information for fragmented MSDU/MMPDUs for the duration of the receive timer. It may be noted that, in some cases, fragmented MSDUs may be discarded after the receive timer has expired and the MSDU may be considered as having not been successfully received even if some fragments were successfully received. The recipient may respond with a compressed BA, in response to an eliciting A-MPDU that contains fragments. In the compressed BA, each bit in the BA Bitmap indicates the receipt status of either a fragment of the MSDU or the full MSDU. According to certain aspects, A-MSDUs may be carried, without fragmentation, within a single QoS data frame.

A STA may be configured to support concurrent reception of fragments of some number of transmissions, for example, at least 3 MSDUs or MMPDUs. In some cases, however, a STA receiving more than three fragmented frames may experience a significant increase in the number of frames discarded. Therefore, the STA may be configured to maintain a Receive Timer for each MSDU/MMPDU being received (e.g., min. 3), and fragments may be discarded if the timer exceeds a specified value (e.g., a dot11MaxReceiveLifetime).

As noted above, there may be tradeoffs to consider when deciding whether or not to use fragmentation. For example, in some cases, fragments may not be allowed to be sent in A-MPDUs, except when VHT Single MPDUs. Further, in such an exceptional case, fragments may only be allowed for those TIDs for which an HT-immediate or HT-delayed Block Ack session is not configured. Fragmentation may be beneficial because it may increase reliability when channel characteristics/OBSS activity limit reception reliability, may increase medium efficiency in consideration of the available duration of granted TXOPs, and may allow efficient use of the allocated resources in an MU transmission. However, in some cases, fragmentation may lead to an increased number of MSDUs being discarded. For example, an MSDU may be dropped when the receive MSDU timer expires, even if only one fragment is missing. This may lead to increased memory requirements at the transmitter and receiver as the transmitter and receiver needs to keep track of the payload contents and length for each fragment and partial-state operation during the Block Ack session may not be employed by the receiver. Fragmentation may also lead to an increase in overhead, as each fragment may require its own A-MPDU/MAC/Security headers (e.g., fragmenting 1500 Bytes in 16 fragments could add at least 450 Bytes of overhead).

In some cases, devices may negotiate the use of fragmentation during a block acknowledgement (BA) setup procedure. In such cases, an Add Block Acknowledgement (ADDBA) Extension IE in an ADDBA Request and/or response may indicate the use of fragmentation. For example, in such case, an originator may set a No-Fragmentation field in ADDBA Extension element of ADDBA Request to indicate certain parameters.

Figure 11:
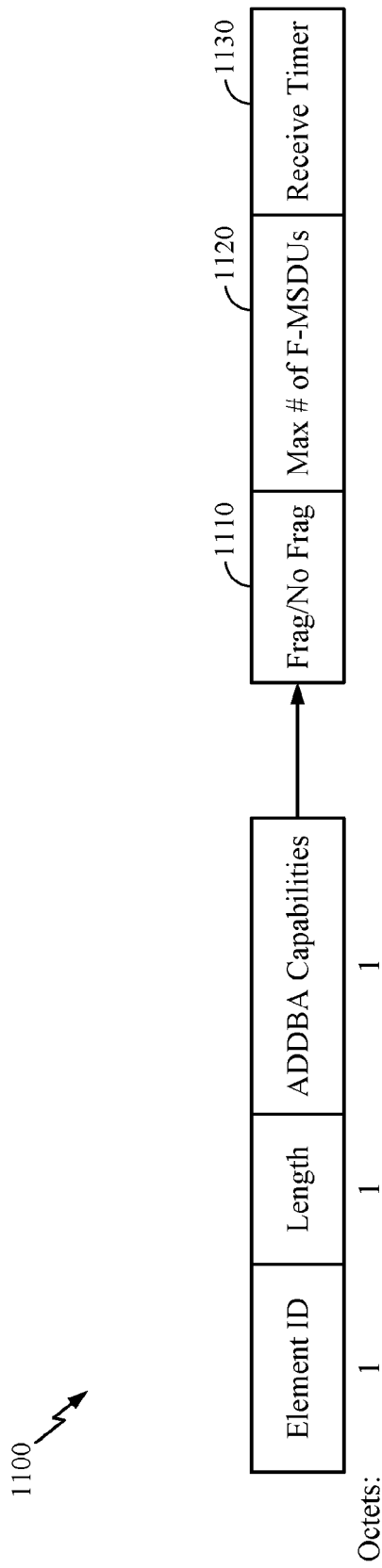
FIG. 11 illustrates an example information element (IE), in accordance with certain aspects of the present disclosure.

FIG. 11 illustrates an example of such an ADDBA Extension element format 1100 that may be included in an ADDBA request or response. As illustrated, the format 1100 may have a Fragmentation/No-Fragmentation Field 1110. In some cases, this field may be set to a value to indicate whether or not an apparatus intends to transmit fragments (e.g., 0 to indicate it intends to transmit fragments, and to 1 to indicate it does not intend to transmit fragments).

In some cases, the recipient (or originator) may additionally specify (e.g., as part of a negotiation) various other fragmentation parameters. For example, a recipient may specify a maximum number of fragmented MSDUs (F-MSDUs) that can be supported concurrently (with fragments for each tracked concurrently). As illustrated, this value may be specified in a field 1120 (e.g., represented as 6 bits) containing the maximum number of concurrent fragmented MSDU/MMPDUs that are supported. This parameter may determine how many bits in the BA Bitmap will be maintained at full state by the receiver. The recipient may also specify the receive timer (e.g., represented as 8 bits in a field 1130 of a response) that represents a period after which fragments are discarded (e.g., further attempts to reassemble a fragmented MMPDU or MSDU are terminated). This parameter may help control memory overhead, by limiting how long full state is maintained for a given fragmented MSDU. In some cases, a dynamic fragmentation field (e.g., represented by a single bit in a field of the response) may indicate the dynamic fragmentation mode (e.g., "0" to indicate support for up to 2 dynamic length fragments per MSDU/MMPDU, or "1" to indicate support for up to 16 dynamic length fragments per MSDU/MMPDU).

In some cases, various other parameters related to fragmentation may also be negotiated. As an example, a (receiving) device may indicate allowance (of an originator) to fragment A-MSDUs. For example, during negotiation, a receiving device may use a bit to indicate whether the receiving device supports reception of fragmented A-MSDUs. In some cases, a receiving device may also specify a minimum length of fragments during negotiation. In such cases, all fragments but for a last fragment may be required to be at least the specified minimum length.

In some cases, what may be considered a relatively simplified version of a fragmentation mechanism may also be used. In this case, peer STAs may use a baseline fragmentation mechanism and may negotiate a baseline Block Ack mechanism where the negotiation parameters described above are to be applied.

In some cases, a transmitter may be allowed to aggregate at most one fragment in an A-MPDU. In such cases, on the receiver side, upon reception of an A-MPDU that contains a single MPDU that solicits a response, the receiving device may respond with an Ack frame (regardless of whether the MPDU contains a fragment or a full MSDU). On the other hand, upon reception of an A-MPDU containing more than one MPDU that solicits a response, the receiving device may respond with a BlockAck frame, wherein the BlockAck frame could be a compressed BlockAck, a multi-TID BlockAck, multi-STA BlockAck or a GCR BlockAck frame that additionally contains an indication for indicating the receipt status of the fragment included in the soliciting PPDU. For example, the receiving device may set a bit in the BlockAck frame for a fragment contained in the A-MPDU that is received successfully. Any reserved bit which is currently unused may be used for this purpose (e.g., an unused bit of a Fragment Number may be used for this purpose).

In certain embodiments the transmitter may include more than one fragment in an A-MPDU, in which case the recipient may respond with a control response frame that acknowledges the multiple fragments according to the teachings herein.

Upon reception of a BlockAck Request (BAR), a receiving device may respond with the appropriate response frame. For example, the receiving device may respond with a compressed BlockAck if no fragments have been received for a corresponding BlockAck window. In some cases, the BAR itself may indicate that it solicits a compressed BlockAck. In some cases, the receiving device may respond with a basic (not compressed) BlockAck, for example, if at least one fragment is received (or the BAR itself specifies a basic BlockAck is solicited).

As noted above, during a fragment-enabled BA session, the originator may fragment MSDUs and carry them in an A-MPDU. The recipient may respond acknowledging the A-MPDU with a shortest BA (e.g., the shortest BA frame may be the C-BlockAck frame). For efficient use of allocated UL/DL resources, in some cases, one fragment in an A-MPDU may be enough.

There may be trade-offs when allowing more than one fragment per A-MPDU. For example, while more than one fragment per A-MPDU may provide flexibility to fragment any MSDU in any number of fragment per-TID, doing so may increase processing overhead. For example, both recipient and originator may need to maintain a Receive Timer for each MSDU (e.g., during which all fragments need to be successfully received or they are flushed). In addition, the recipient may need to store the payload for each fragment of each MSDU that is fragmented as fragments are not delivered to upper layers but stored locally until MSDU is derived. This approach may also increase the likelihood of discarded MSDUs due to receive timer expiration (e.g., even if only one fragment is missing) and result in increased implementation complexity due to additional fragmentation/defragmentation procedures, as well as increased overhead as each added fragment requires its own MPDU delimiter/MAC/security headers.

Figure 12:
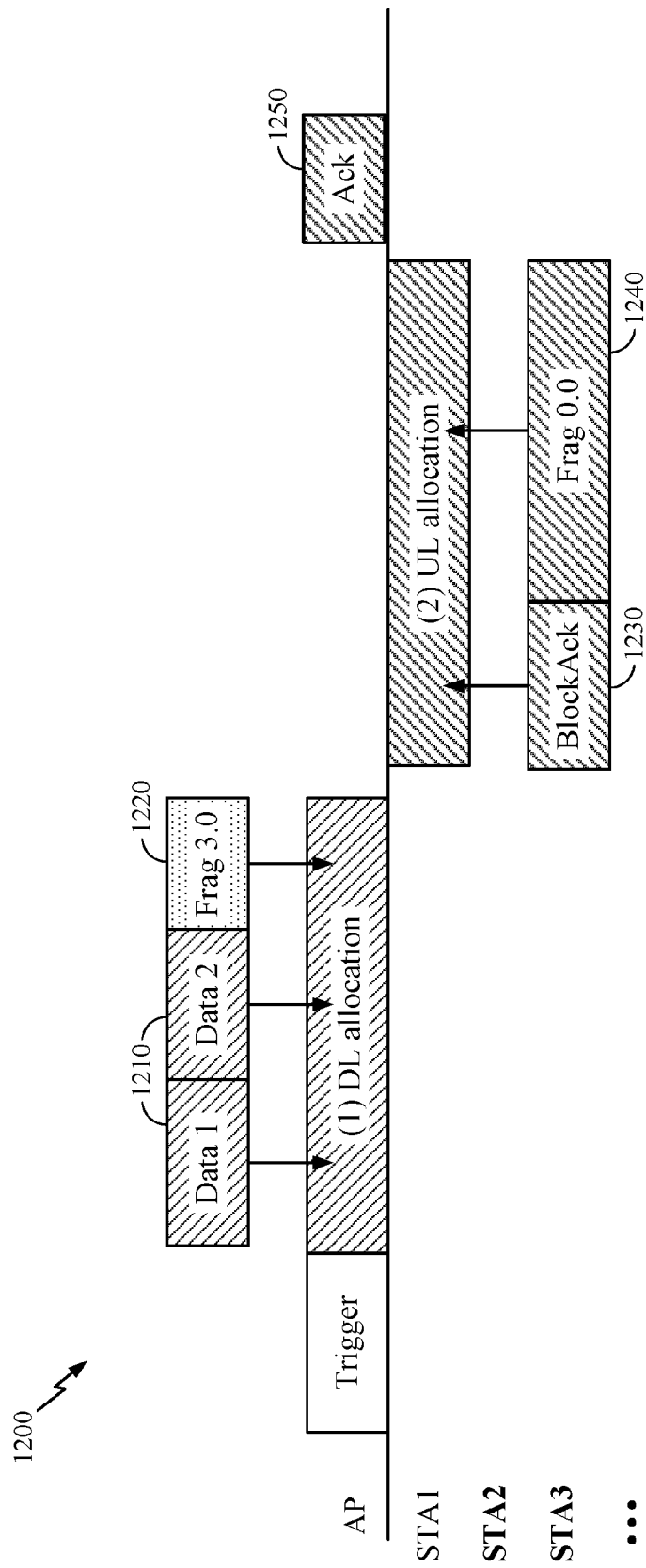
FIG. 12 illustrates an example exchange using fragmentation, in accordance with aspects of the present disclosure.

As illustrated in the example exchange 1200 of FIG. 12, in some cases, an originator may decide to use fragmentation "on-the-fly" whenever it determines fragmentation will result in efficient use of resources. In the illustrated example, two MSDUs 1210 may not be fragmented (Data 1 and Data 2) while a third may be fragmented (e.g., in up to 2 fragments for Dyn. Frag.=0 or up to 16 fragments for Dyn. Frag.=1). The first fragment 1220 (of Data 3 labeled Frag 3.0) may be used to efficiently fill the allocated resource. In either case, there may be no length restriction for any of the fragments. As noted above, in some cases, only one fragment of an MSDU/MMPDU may be transmitted in the A-MPDU.

The rest of the fragments of the frame may be scheduled for transmission in successive TXOPs. The Recipient may respond (using resources of an UL allocation) to an eliciting frame that contains a fragment with either of the following: an Ack frame if the fragment is carried in a (VHT Single) MPDU or a compressed BlockAck frame if the fragment is carried in an A-MPDU. Each bit in a bitmap 1240 may acknowledge receipt status of non-fragment MSDUs or of the fragment of the MSDU that is carried in the eliciting A-MPDU. As illustrated, the AP may send an ACK frame 1250 acknowledging receipt of the BlockAck frame 1230.

Fragmentation in this manner may be beneficial as an Originator may efficiently fill the allocated resources using the first fragment to fill resource that cannot be filled with full MSDU/MMPDU. Further, a receiver may not need significant memory to support fragmentation (as only a limited amount of resources are required to store fragments and the number of concurrently supported fragmented transmissions may be limited).

In some cases, an MSDU may be fragmented in 2 parts, and delivered in order which may be easily processed by receiver. For example, the payload of the first fragment is stored in the same buffer location of the MSDU. Upon reception of the second fragment, the MSDU may be immediately constructed. Once constructed, the MSDU may be sent to higher layer and the memory may be released for other MSDUs. This may also reduce the number of discarded frames due to fragmentation is reduced as: 2 fragments are expected to be exchanged in a few TXOPs (e.g., 2 or more). This approach may make it easier for the originator to make sure that Receive Timer does not expire. The use of 2 fragments may also reduce overhead due to fragmentation, which generally increases with the number of fragments (with 2 fragments this overhead is minimal).

Figure 13A:
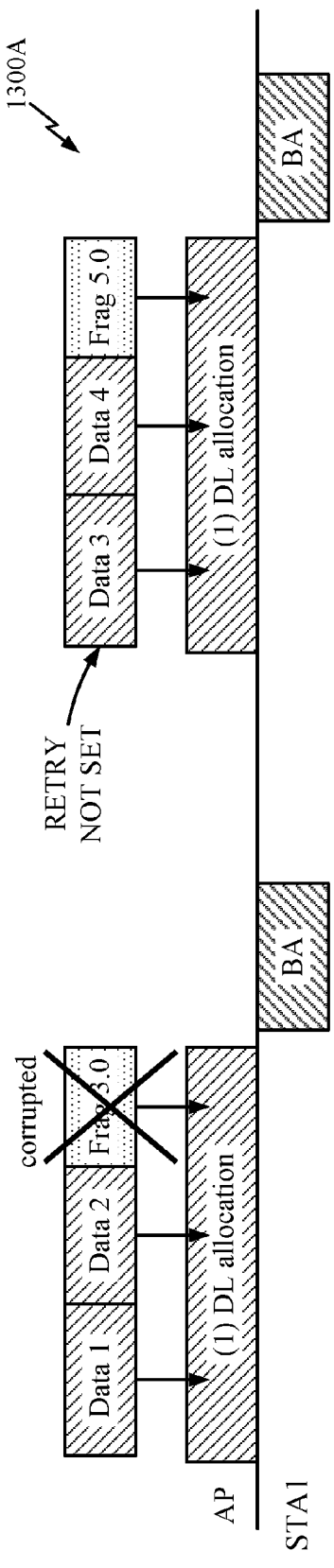
FIGS. 13A and 13B illustrate example exchanges using fragmentation, in accordance with aspects of the present disclosure.
Figure 13B:
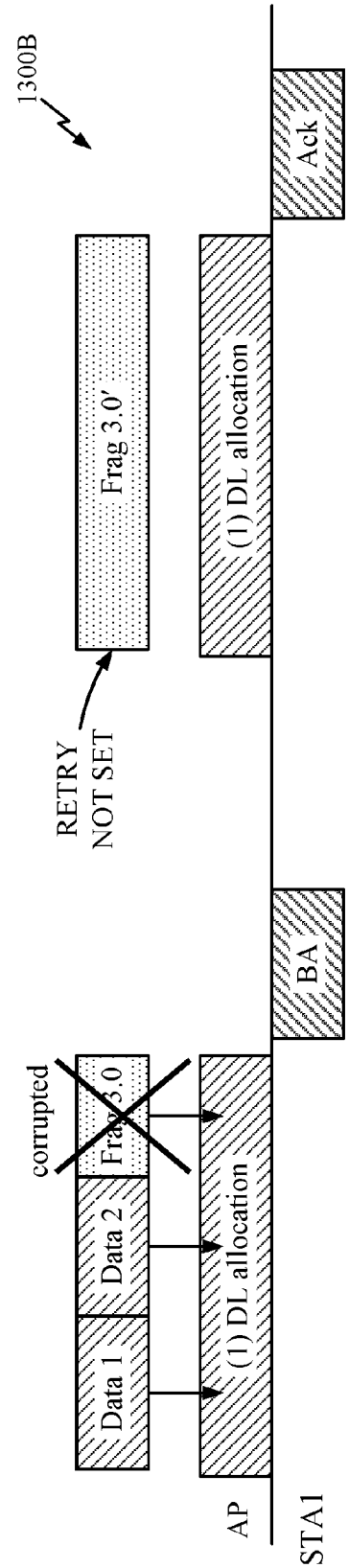

FIGS. 13A and 13B illustrate example exchanges 1300A and 1300B using fragmentation with 2-fragment BA exchanges, in accordance with aspects of the present disclosure. As illustrated in FIG. 13A, MSDUs 1210 may not be fragmented (Data 1 and Data 2), while an MSDU for Data 3 may be fragmented. In this example, when reception of a first fragment (a first fragment of Data3 labeled Frag 3.0) is not acknowledged (e.g., is negatively acknowledged in a compressed BA frame), the transmitter will transmit the FULL original MPDU (Data 3) in the next TXOP. In some cases, a RETRY bit may NOT be set for the full MPDU transmission (or re-transmission), even if only a fragment of the MPDU was previously transmitted. As illustrated in FIG. 13B, if the entire MPDU (for Data 3) does NOT entirely fit in the TXOP, the transmitter may be allowed to re-fragment the MPDU (with the first fragment of the re-fragmented MPDU labeled as Frag 3.0') and determine a new boundary between the two fragments (again, the RETRY bit may not be set).

Figure 14A:
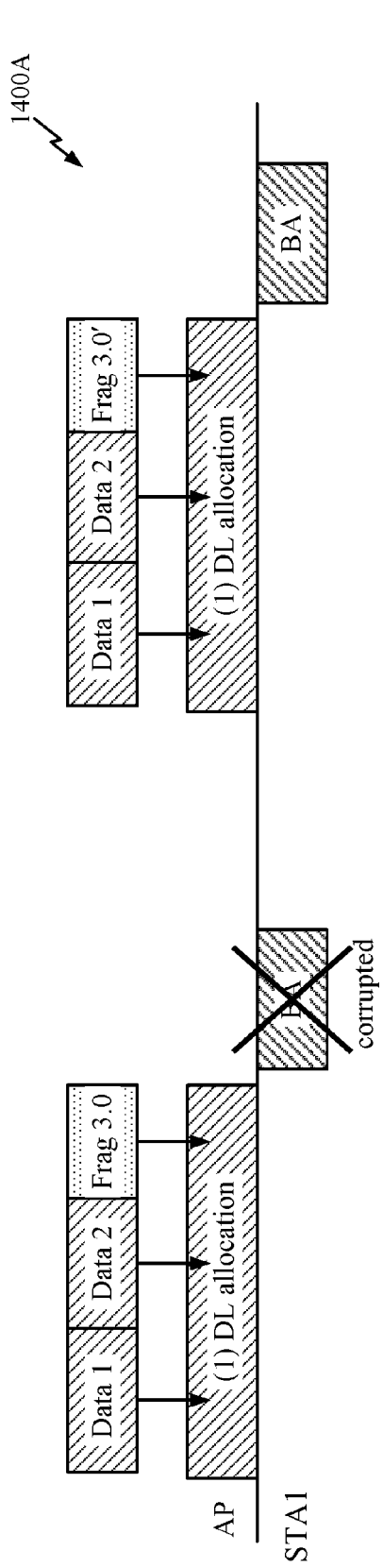
FIGS. 14A and 14B illustrate example exchanges using fragmentation, in accordance with aspects of the present disclosure.
Figure 14B:
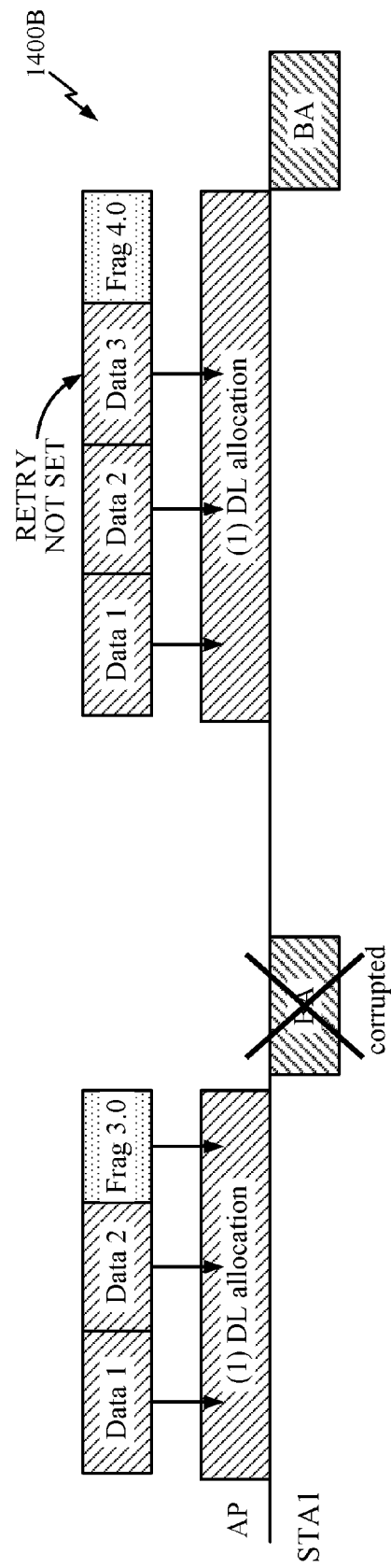

FIGS. 14A and 14B illustrate other example exchanges 1400A and 1400B using fragmentation with 2-fragment BA exchanges, in accordance with aspects of the present disclosure. As illustrated in FIG. 14A, after a first transmission, a BA is not successfully received (e.g., it may be corrupted). In case of a re-transmission where again MPDU for Data3 needs to be fragmented, the first fragment (Frag 3.0) may be allowed to be resized (with the resized fragment labeled as Frag 3.0') to make it smaller or larger, which may help manage varying TXOP times. On the other hand, as illustrated in FIG. 14B, if there is enough time in the TXOP, MPDU 3 may not need to be fragmented at all (and the entire MPDU for Data 3 may be sent unfragmented).

As presented herein, fragmentation may be enabled for MU operation using BA negotiation procedure between originator and recipient. This approach may enable the recipient to signal its capabilities to the transmitter and signal various parameters (e.g., signaling Receive Timer for minimizing # of frames discarded due to fragmentation, Max # of F-MSDUs for which full state BA score is maintained, and Dynamic-length fragmentation selection). This approach may help increase flexibility of fragmentation, by allowing fragments to have dynamic lengths and carried in A-MPDUs, while still using existing compressed BlockAck frames to acknowledge frames during the fragment enabled BlockAck session.

Figure 7A:
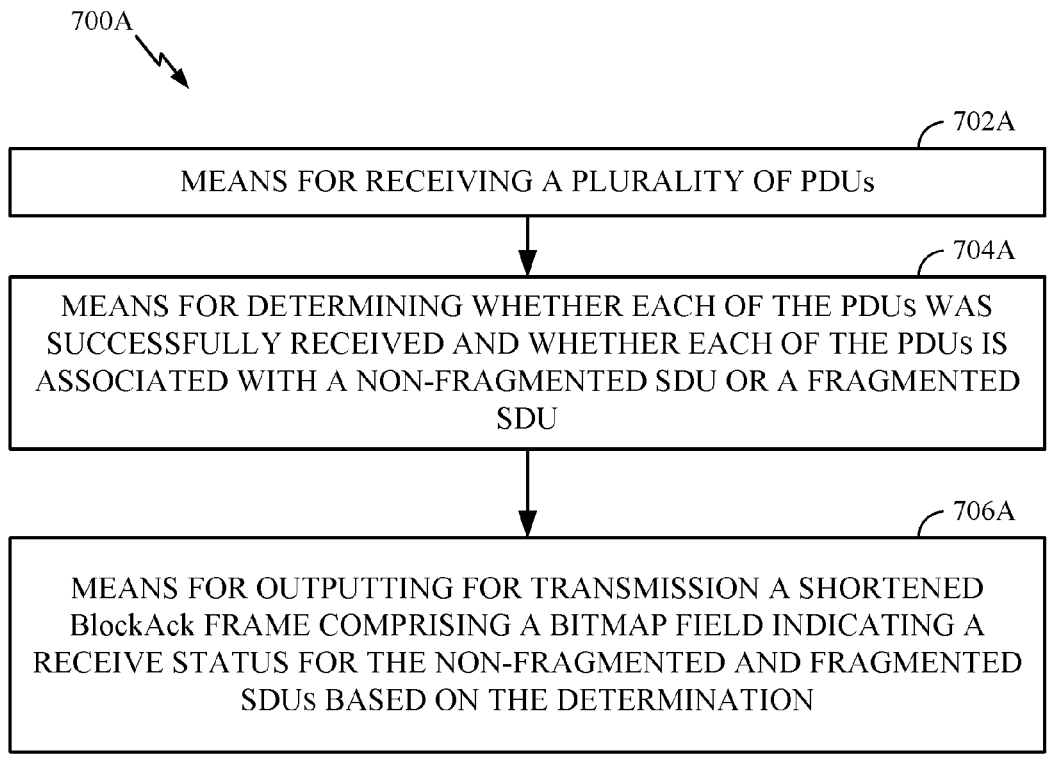
FIG. 7A illustrates example means capable of performing the operations shown in FIG. 7.
Figure 8A:
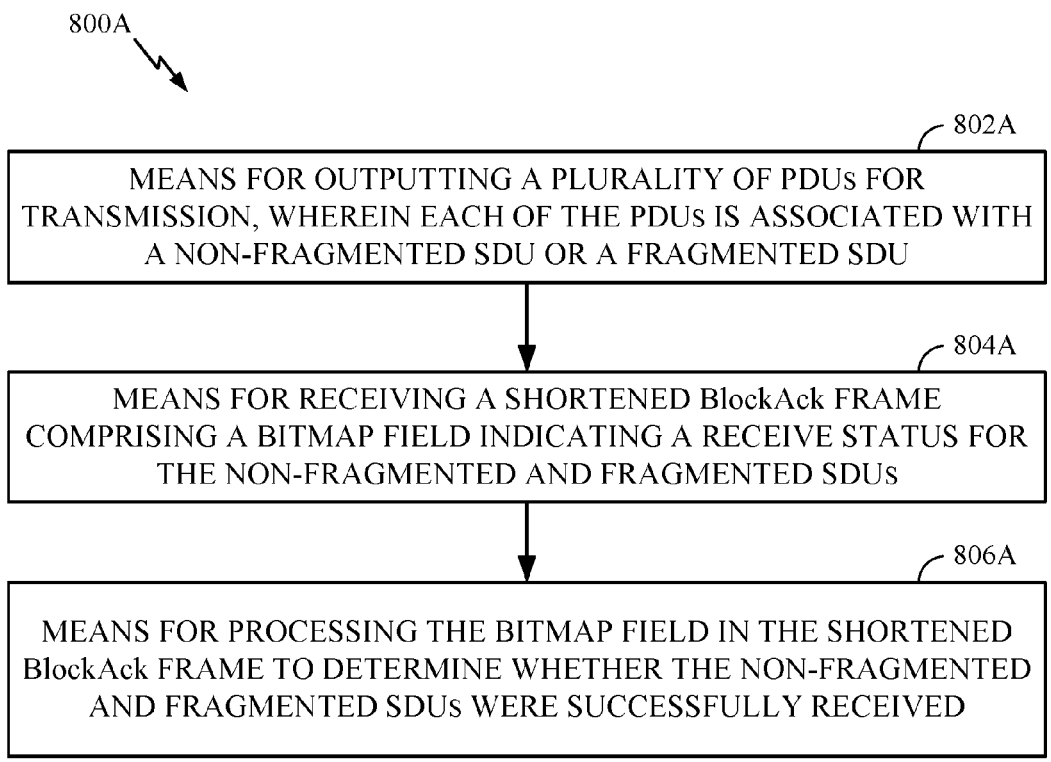
FIG. 8A illustrates example means capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800 illustrated in FIGS. 7 and 8 correspond to means 700A and 800A illustrated in FIGS. 7A and 8A, respectively.

For example, means for transmitting may comprise a transmitter (e.g., the transmitter unit 222) and/or the antenna(s) 224 of the access point 110 illustrated in FIG. 2, a transmitter (e.g., the transmitter unit 254) and/or the antenna(s) 252 of the user terminal 120 portrayed in FIG. 2, or the transmitter 310 and/or antenna(s) 316 depicted in FIG. 3. Means for receiving may comprise a receiver (e.g., the receiver unit 222) and/or the antenna(s) 224 of the access point 110 illustrated in FIG. 2, a receiver (e.g., the receiver unit 254) and/or the antenna(s) 252 of the user terminal 120 shown in FIG. 2, or the receiver 312 and/or antenna(s) 316 depicted in FIG. 3. Means for processing, means for generating, means for outputting, and/or means for determining may comprise a processing system, which may include one or more processors (e.g., capable of implementing the algorithm or operations 700 and 800), such as the RX data processor 242, the TX data processor 210, and/or the controller 230 of the access point 110 illustrated in FIG. 2, the RX data processor 270, the TX data processor 288, and/or the controller 280 of the user terminal 120 illustrated in FIG. 2 or the processor 304 and/or the DSP 320 portrayed in FIG. 3.

In some case, rather than actually transmitting a packet (or frame), a device may have an interface to output a packet for transmission. For example, a processor may output a packet, via a bus interface, to an RF front end for transmission. Similarly, rather than actually receiving a packet (or frame), a device may have an interface to obtain a packet received from another device. For example, a processor may obtain (or receive) a packet, via a bus interface, from an RF front end for reception.

According to certain aspects, such means may be implemented by processing systems configured to perform the corresponding functions by implementing various algorithms (e.g., in hardware or by executing software instructions). These algorithms may include, for example, an algorithm for receiving a plurality of PDUs, an algorithm for determining whether each of the PDUs was successfully received and whether each of the PDUs is associated with a non-fragmented SDU or a fragmented SDU, and an algorithm for outputting for transmission a shortened BlockAck frame comprising a bitmap field indicating a receive status for the non-fragmented and fragmented SDUs based on the determination. As another example, these algorithms may include an algorithm for outputting a plurality of PDUs for transmission, wherein each of the PDUs is associated with a non-fragmented SDU or a fragmented SDU; an algorithm for receiving a shortened BlockAck frame comprising a bitmap field indicating a receive status for the non-fragmented and fragmented SDUs; and an algorithm for processing the bitmap field in the shortened BlockAck frame to determine whether the non-fragmented and fragmented SDUs were successfully received.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
   a memory; and
   a processor coupled with the memory and configured to:
      receive a plurality of protocol data units (PDUs),
      determine whether each of the PDUs was successfully received and whether each of the PDUs carries a non-fragmented service data unit (SDU) or a fragmented SDU, wherein at least one of the PDUs comprises at least one fragmented SDU; and
      output for transmission a shortened block acknowledgment (BlockAck) frame, shorter than a basic BlockACK frame, comprising a bitmap field indicating a receive status for any non-fragmented SDUs and the at least one fragmented SDU based on the determination, wherein the bitmap field in the shortened BlockAck frame has a variable length, and wherein the variable length is indicated by a value of one or more most significant bits of a fragment number (FN) in the shortened BlockAck frame.

2. The apparatus of claim 1, wherein the at least one fragmented SDU is received in an aggregated MPDU (A-MPDU).

3. The apparatus of claim 1, wherein a number of the non-fragmented and fragmented SDUs that can be acknowledged by the bitmap field in the shortened BlockAck frame is variable.

4. The apparatus of claim 1, wherein each bit in the bitmap field in the shortened BlockAck frame indicates the receive status for one of the non-fragmented SDUs or at least one of: the first fragment of one of the fragmented SDUs, all fragments of one of the fragmented SDUs, or a sole fragment for one of the fragmented SDUs.

5. The apparatus of claim 1, wherein the processor is further configured to select the shortened BlockAck frame over a basic BlockAck frame before the shortened BlockAck is output for transmission.

6. The apparatus of claim 1, wherein the processor is further configured to participate in a negotiation, with a transmitter of the plurality of PDUs, for one or more fragmentation parameters used in transmitting or processing the fragmented SDUs.

7. The apparatus of claim 6, wherein the one or more parameters comprise at least one of: a maximum number of concurrent fragmented transmissions supported by the apparatus or a minimum fragment length supported by the apparatus.

8. The apparatus of claim 6, wherein the processor is further configured to provide an indication of whether fragmentation is supported during the negotiation.

9. The apparatus of claim 6, wherein the negotiation is performed during at least one of: a BlockAck setup or an association with the transmitter.

10. The apparatus of claim 1, wherein:
   the shortened BlockAck frame comprises a starting sequence control (SSC) field; and
   the value of the FN is indicated in the SSC field.

11. The apparatus of claim 1, wherein a value of a least significant bit (LSB) of the FN in the shortened BlockAck frame indicates whether the shortened BlockAck frame indicates a receive status of non-fragmented SDUs or fragmented SDUs.

12. The apparatus of claim 11, wherein a value of zero for the value of the LSB indicates a non-fragmented SDU and a non-zero value for the value of the LSB indicates a fragmented SDU.

13. The apparatus of claim 1, wherein the at least one processor is configured to participate in a negotiation, with a transmitter of the plurality of PDUs, to determine whether fragmentation used.

14. The apparatus of claim 13, wherein the negotiation comprises exchanging an Add Block Acknowledgment (ADDBA) Extension Information Element (IE) in at least one of: an ADDBA request or an ADDBA response.

15. The apparatus of claim 1, wherein each fragmented SDU comprises four fragments.

16. An apparatus for wireless communications, comprising:
   a memory; and
   a processor coupled with the memory and configured to:
      output a plurality of protocol data units (PDUs) for transmission, wherein each of the PDUs carries a non-fragmented service data unit (SDU) or a fragmented SDU, and wherein at least one of the PDUs comprises at least one fragmented SDU;
      receive a shortened block acknowledgment (BlockAck) frame, shorter than a basic BlockACK frame, comprising a bitmap field indicating a receive status for any non-fragmented SDUs and the at least one fragmented SDU, wherein the bitmap field in the shortened BlockAck frame has a variable length, and wherein the variable length is indicated by values of one or more most significant bits of a fragment number (FN) in the shortened BlockAck frame; and
      process the bitmap field in the shortened BlockAck frame to determine whether the non-fragmented SDUs and the at least one fragmented SDU were successfully received.

17. The apparatus of claim 16, wherein the at least one fragmented SDU is transmitted in an aggregated MPDU (A-MPDU).

18. The apparatus of claim 16, wherein a number of the non-fragmented and fragmented SDUs that can be acknowledged by the bitmap field in the shortened BlockAck frame is variable.

19. The apparatus of claim 16, wherein each bit in the bitmap field in the shortened BlockAck frame indicates the receive status for one of the non-fragmented SDUs or at least one of the first fragment of one of the fragmented SDUs, collectively all fragments of one of the fragmented SDUs, or the sole fragment for one of the fragmented SDUs.

20. The apparatus of claim 16, wherein the processor is further configured to:
output a block acknowledgement request for transmission after the bitmap field is processed, wherein the bitmap field indicated that at least one of the non-fragmented and fragmented SDUs was not successfully received, and
receive a basic BlockAck frame in response to the block acknowledgement request, wherein the bitmap field in the basic BlockAck frame indicates the receive status for each of the non-fragmented SDUs and each fragment of the fragmented SDUs.

21. The apparatus of claim 16, wherein the processor is further configured to:
output for retransmission fragments of the at least one of the fragmented SDUs after the bitmap field is processed, wherein the bitmap field indicated that at least one of the fragmented SDUs was not successfully received.

22. The apparatus of claim 16, wherein the processor is further configured to participate in a negotiation, with at least one intended recipient of the plurality of PDUs, for one or more fragmentation parameters used in transmitting or processing the fragmented SDUs.

23. The apparatus of claim 22, wherein the one or more parameters comprise at least one of: a maximum number of concurrent fragmented transmissions supported by the intended recipient or a minimum fragment length supported by the intended recipient.

24. The apparatus of claim 22, wherein the processor is further configured to receive an indication of whether fragmentation is supported during the negotiation.

25. The apparatus of claim 22, wherein the negotiation is performed during at least one of: a BlockAck setup or an association with the transmitter.

26. A method for wireless communications, comprising:
receiving a plurality of protocol data units (PDUs);
determining whether each of the PDUs was successfully received and whether each of the PDUs carries a non-fragmented service data unit (SDU) or a fragmented SDU, and wherein at least one of the PDUs comprises at least one fragmented SDU; and
outputting for transmission a shortened block acknowledgment (BlockAck) frame, shorter than a basic BlockACK frame, comprising a bitmap field indicating a receive status for any non-fragmented SDUs and the at least one fragmented SDU based on the determination, wherein the bitmap field in the shortened BlockAck frame has a variable length, and wherein the variable length is indicated by values of one or more most significant bits of a fragment number (FN) in the shortened BlockAck frame.

27. The method of claim 26, further comprising participating in a negotiation, with a transmitter of the plurality of PDUs, for one or more fragmentation parameters used in transmitting or processing the fragmented SDUs.

28. A method for wireless communications, comprising:
outputting a plurality of protocol data units (PDUs) for transmission, wherein each of the PDUs carries a non-fragmented service data unit (SDU) or a fragmented SDU, and wherein at least one of the PDUs comprises at least one fragmented SDU;
receiving a shortened block acknowledgment (BlockAck) frame, shorter than a basic BlockACK frame, comprising a bitmap field indicating a receive status for any non-fragmented SDUs and the at least one fragmented SDU; and
processing the bitmap field in the shortened BlockAck frame to determine whether the non-fragmented SDUs and the least one fragmented SDUs were successfully received, wherein the bitmap field in the shortened BlockAck frame has a variable length, and wherein the variable length is indicated by values of one or more most significant bits of a fragment number (FN) in the shortened BlockAck frame.

29. The method of claim 28, further comprising participating in a negotiation, with at least one intended recipient of the plurality of PDUs, for one or more fragmentation parameters used in transmitting or processing the fragmented SDUs.

* * * * *